(12) United States Patent
Seliskar et al.

(10) Patent No.: US 7,862,671 B2
(45) Date of Patent: Jan. 4, 2011

(54) WELDING OF A POLYMERIC MATERIAL AND STRUCTURES FORMED THEREBY

(75) Inventors: James Thomas Seliskar, Bay City, MI (US); James David Oelberg, Saginaw, MI (US)

(73) Assignee: Dow Global Technologies Inc., Midland, MI (US)

( * ) Notice: Subject to any disclaimer, the term of this patent is extended or adjusted under 35 U.S.C. 154(b) by 996 days.

(21) Appl. No.: 11/622,191

(22) Filed: Jan. 11, 2007

(65) Prior Publication Data

US 2008/0169055 A1 Jul. 17, 2008

(51) Int. Cl.
 *B32B 37/00* (2006.01)
(52) U.S. Cl. .................. 156/73.5; 156/308.2
(58) Field of Classification Search ............. 156/73.1, 156/73.5, 308.2, 308.4, 580, 580.1, 580.2, 156/581, 583.1
See application file for complete search history.

(56) References Cited

U.S. PATENT DOCUMENTS

| | | | |
|---|---|---|---|
| 3,236,917 A | 2/1966 | Natta et al. | |
| 3,645,992 A | 2/1972 | Elston | |
| 4,701,432 A | 10/1987 | Welborn, Jr. | |
| 4,935,397 A | 6/1990 | Chang | |
| 4,937,299 A | 6/1990 | Ewen et al. | |
| 4,937,301 A | 6/1990 | Chang | |
| 5,055,438 A | 10/1991 | Canich | |
| 5,194,509 A | 3/1993 | Hasenbein et al. | |
| 5,272,236 A | 12/1993 | Lai et al. | |
| 5,278,272 A | 1/1994 | Lai et al. | |
| 6,033,505 A * | 3/2000 | Sugiyama et al. | 156/73.5 |
| 6,159,317 A * | 12/2000 | Sugiyama et al. | 156/73.5 |
| 6,177,515 B1 | 1/2001 | Smith et al. | |
| 6,251,997 B1 | 6/2001 | Imai et al. | |
| 6,300,415 B1 | 10/2001 | Okayama et al. | |
| 6,300,419 B1 | 10/2001 | Sehanobish et al. | |
| 6,329,454 B1 | 12/2001 | Krabbenborg | |
| 6,403,692 B1 | 6/2002 | Traugott | |
| 6,689,841 B2 | 2/2004 | Jung et al. | |
| 6,734,253 B2 | 5/2004 | Krabbenborg et al. | |
| 6,797,089 B2 | 9/2004 | Brahm et al. | |
| 6,869,993 B2 | 3/2005 | Watanabe et al. | |
| 6,967,225 B2 | 11/2005 | Mcenhill et al. | |
| 2001/0018485 A1 | 8/2001 | Matsuoka et al. | |
| 2003/0229169 A1 | 12/2003 | Han | |

(Continued)

FOREIGN PATENT DOCUMENTS

EP 129368 12/1984

(Continued)

OTHER PUBLICATIONS

International Search Report PCT/US2007/067363, Aug. 22, 2007.

(Continued)

*Primary Examiner*—James Sells
(74) *Attorney, Agent, or Firm*—Dobrusin & Thennisch PC

(57) ABSTRACT

The present invention is directed to welding of a polymeric material and structures formed by such welding. The material is preferably a thermoplastic material that is a blend of one or more thermoplastic polyolefins and one or more elastomers. One preferred welding technique is vibration welding.

20 Claims, 4 Drawing Sheets

U.S. PATENT DOCUMENTS

| | | |
|---|---|---|
| 2004/0044107 A1 | 3/2004 | Kikuchi |
| 2005/0154101 A1 | 7/2005 | Mcenhill et al. |
| 2006/0058434 A1 | 3/2006 | Watanabe |
| 2007/0117909 A1 | 5/2007 | Seliskar et al. |
| 2007/0246862 A1 | 10/2007 | Jones et al. |
| 2008/0045645 A1 | 2/2008 | Seliskar et al. |
| 2008/0169055 A1 | 7/2008 | Seliskar et al. |

FOREIGN PATENT DOCUMENTS

| | | |
|---|---|---|
| EP | 260999 A1 | 9/1987 |
| EP | 639613 A1 | 2/1995 |
| WO | 90/07526 | 7/1990 |
| WO | WO 00/77335 A | 12/2000 |
| WO | 01/42344 A1 | 6/2001 |
| WO | 02/22731 A | 3/2002 |
| WO | 02/085972 A1 | 10/2002 |
| WO | 2004/009657 A1 | 1/2004 |
| WO | 2005/111145 A | 11/2005 |
| WO | 2007/002435 A1 | 1/2007 |
| WO | 2008/020925 A1 | 2/2008 |

OTHER PUBLICATIONS

Hifax X 1956A, Advanced Plyolefin, Product Information Sheet.
Copending application, Application No. PCT/US07/087265, filed Dec. 12, 2007.
International Preliminary Report on Patentability, Dated Jul. 25, 2008, International Application No. PCT/US2007/067363.
Copending application, U.S. Appl. No. 11/622,197, filed Jan. 11, 2007, Published on Feb. 21, 2008 as US2008/0045645 (Office Action recently received).
International Search Report PCT/US2007/087265, Dated Mar. 31, 2008.
International Preliminary Report on Patentability, Dated Mar. 17, 2009, PCT/US2007/087265.

* cited by examiner

WELDING OF A POLYMERIC MATERIAL AND STRUCTURES FORMED THEREBY

FIELD OF THE INVENTION

The present invention relates to welding of a polymeric material and structures formed by such welding. More particularly, the present invention relates to welding (e.g., vibration welding) of a thermoplastic material wherein the thermoplastic material is a blend of one or more thermoplastic polyolefins and one or more elastomers.

BACKGROUND OF THE INVENTION

Welding, for instance vibration welding, of polymeric materials is useful in the processing and manufacturing of various articles of manufacture. For example, welding can be used in the formation and manufacture of structures of automotive vehicles, household goods, appliances, electronics (e.g., radios, computers, telephones), housings, buildings, aerospace vehicles, furniture or the like. While one polymeric member can typically be welded, at least to some degree, to nearly any second polymeric material, the susceptibility of different polymeric materials to welding can vary quite significantly. This variability can result in welds that exhibit characteristics such as weld strength, weld toughness and the like that also vary depending upon the materials being welded, the welding techniques used, combinations thereof or the like.

Industry has expressed a desire and need for polymeric materials and/or welding techniques, which can form welds that exhibit desirable characteristics such as ease of welding, good weld strength, good weld toughness, combinations thereof or otherwise. Moreover, such materials can be particularly desirable if the materials themselves additionally exhibit other desirable properties such as structural integrity, ductility, desirable aesthetics, scratch resistance, combinations thereof or the like that may or may not be related to weldability. Therefore, the present invention provides a polymeric material, techniques for welding the material and structures formed by welding of the material wherein the material is able to form welds that unexpectedly exhibit desirable characteristics and wherein the material may exhibit one or more desirable characteristics in addition to weldability

DETAILED DESCRIPTION OF THE INVENTION

Figure 1:
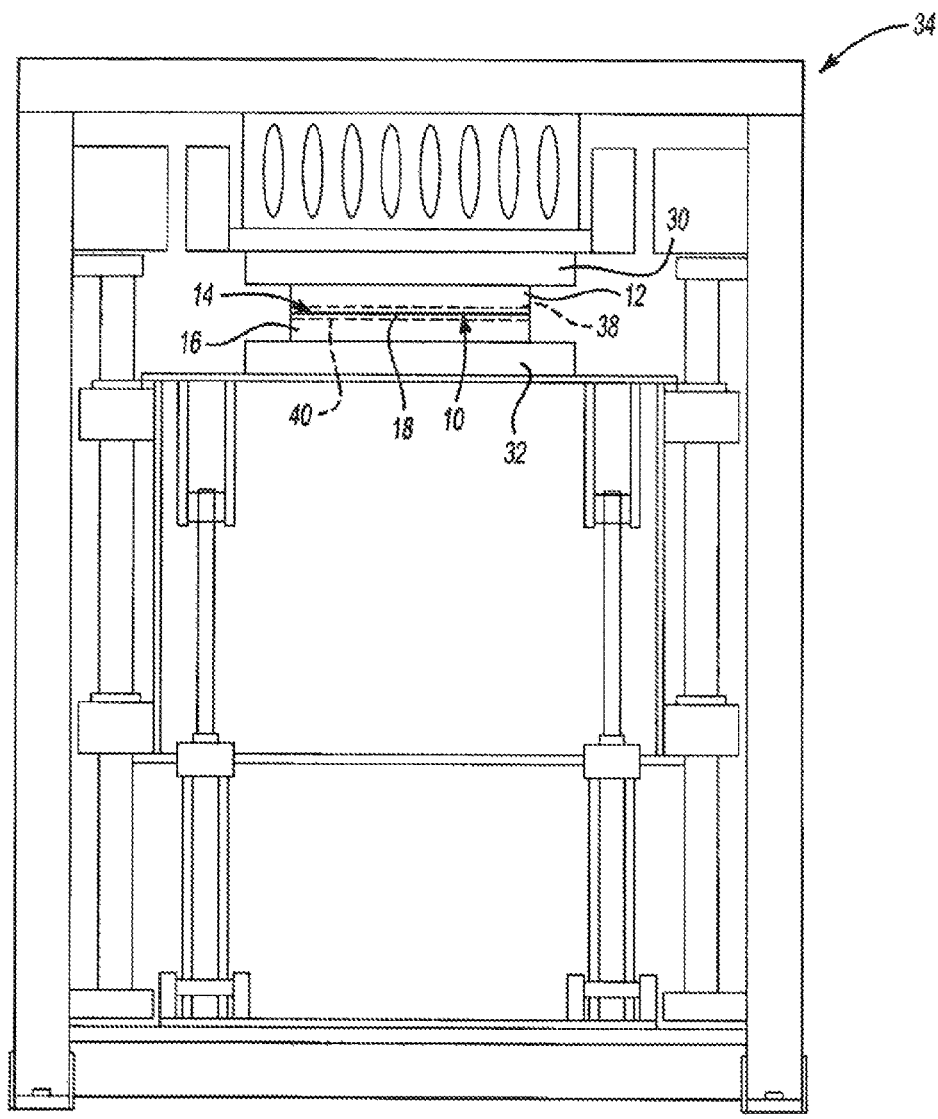
FIG. 1 is an illustration of an exemplary welding process being performed according to an aspect of the present invention.

The present invention is directed to a process of welding (e.g., vibration welding) a polymeric material where the polymeric material is capable of forming welds having one or more desirable characteristics. The present invention is also directed to structures that include one or more welds formed with the polymeric material. The polymeric material is typically comprised of thermoplastic polyolefin, elastomer and, preferably, one or more additives that can include, without limitation, filler, antioxidant, molding agent, amine, amide, combinations thereof or others. The thermoplastic polyolefin can be comprised of one or more thermoplastics, but typically includes polypropylene (PP), polyethylene (PE) or both with at least a portion of the polypropylene and/or polyethylene have a relatively high crystallinity. The elastomer can include a variety of elastomers, but preferably includes one or more linear ethylene copolymers or interpolymers (also known as "LEPs") and/or one or more substantially linear ethylene copolymers or interpolymers (also known as "SLEPs"). As used herein, SLEPs typically include LEPs.

The polymeric material can include a variety of polymers such as thermoplastic polymers, thermosettable polymers, elastomers or any combination thereof. Suitable plastic materials can include, without limitation, thermosettable plastics such as polyurethane, epoxy or thermosetting silicone and thermoplastics such as polycarbonates ("PC"), ABS, polypropylene ("PP"), high impact polystyrene ("HIPS"), polyethylene ("PE"), polyester, polyacetyl, thermoplastic elastomers, thermoplastic polyurethanes ("TPU"), nylon, ionomer (e.g., Surlyn), polyvinyl chloride ("PVC") and including blends of two or more of these thermoplastics and/or thermosets such as PC and ABS. Of course, the polymeric material can include other polymers or additives within the scope of the present invention.

Polymeric Material

According to preferred embodiments, the polymeric material includes a substantial portion of thermoplastic polyolefin, and more particularly, includes a substantial portion of polypropylene, polyethylene or both. The polymeric material or composition typically includes at least about 40% although possibly less, more typically at least about 60% and still more typically at least about 75% by weight polypropylene, polyethylene or a combination thereof. The polymeric material also typically includes less than about 95% although possibly more, more typically less than about 90% and possibly less than about 85% by weight polypropylene, polyethylene (e.g., HDPE or LDPE) or a combination thereof.

A substantial portion of the thermoplastic polyolefin of the polymeric composition is typically relatively highly crystalline. Thus, a relatively high percentage of the polypropylene, the polyethylene or a combination thereof is isotactic and/or has crystallinity greater than certain predetermined values. The thermoplastic polyolefin will typically be comprised of ingredients (e.g., polypropylene, polyethylene or both) wherein at least 50% but possibly less, more typically at least 70% and even more typically at least 85% by weight of the thermoplastic polyolefin has a crystallinity greater than about 40%, more typically greater than about 50% and even more typically greater than about 60%, still more typically greater than about 65% and even possibly greater than about 75%.

Percent crystallinity is measured by differential scanning calorimetry, according to ASTM D3417. A milligram size sample of polymer is sealed into an aluminum DSC pan. The sample is placed into a DSC cell with a 25 cubic centimeter per minute nitrogen purge and cooled to −100 C. A standard thermal history is established for the sample by heating at 10 C/minute to 225° C. The sample is then cooled (at 10° C./minute) to −100° C. and reheated at 10° C./minute to 225° C. The observed heat of fusion for the second scan is recorded ($\Delta H_{observed}$). The observed heat of fusion is related to the degree of crystallinity in weight percent based on the weight of the polypropylene sample by the following equation:

$$\% \ Crystallinity = \frac{\Delta H_{observed}}{\Delta H_{isotacticPP}} \times 100,$$

where the heat of fusion for isotactic polypropylene as reported in B. Wunderlich, Macromolecular Physics, Volume 3, Crystal Melting, Academic Press, New York, 1980, p. 48, is 165 Joules per gram of polymer.

Typically there is a preference for the relatively high crystallinity portion of the thermoplastic polyolefin to be comprised of at least 60%, more typically at least 75%, even more typically at least 95% or even substantially entirely or entirely of one or more polypropylenes (e.g., one type of polypropylene or a blend of 2, 3, 4, or more polypropylenes). However, a percentage of the relatively high crystalline portion or another portion of the thermoplastic polyolefin can be polyethylene (e.g., HDPE). When included, the polyethylene typically comprises between about 1% and about 15% of the thermoplastic polyolefin.

The relatively high crystallinity portion of the polyolefin, whether it is entirely of one or more polypropylenes or it includes polyethylene or otherwise, typically has a melt flow rate (MFR) within a desired range. That MFR is typically less than about 29 g/10 min, more typically less than about 22 g/10 min and even more typically less than about 20 g/10 min, but is typically greater than about 0.1 g/10 min, more typically greater than about 0.5 g/10 min and possibly greater than about 4 g/10 min, although higher or lower values may be possible unless otherwise stated.

In one embodiment, it is preferred for the thermoplastic polyolefin to include a first polypropylene having a first or lower MFR and a second polypropylene having a second or higher MFR. The first polypropylene has a melt flow rate (MFR) melt flow rate of less than about 50 g/10 min (at 230° C., 2.16 kg)(e.g., about 1 to about 50 g/10 min, more particularly about 3 to about 20 g/10 min, and still more particularly about 6 g/10 min to about 13 g/10 min). The first polypropylene can be a neat polypropylene or a blended polypropylene but is typically a polypropylene homopolymer, although not required unless otherwise stated. The first polypropylene, when included, is typically at least about 1%, more typically at least about 10% and even more typically at least about 25%, but typically less than about 95%, more typically less than about 85% and even more typically less than about 70% by weight of the polymeric material.

When included, the second polypropylene typically has a melt flow rate (MFR) of less than about 70 g/10 min (at 230° C., 2.16 kg)(e.g., about 1 to about 55 g/10 min, more particularly about 5 to about 45 g/10 min, and still more particularly about 25 g/10 min to about 40 g/10 min). The second polypropylene can be a neat polypropylene or a blended polypropylene but is typically a polypropylene homopolymer, although not required unless otherwise stated. The second polypropylene, when included, is typically at least about 0.1%, more typically at least about 5% and even more typically at least about 8%, but typically less than about 60%, more typically less than about 40% and even more typically less than about 22% by weight of the polymeric material.

It is also contemplated that the thermoplastic polyolefin can comprise one or more lower crystallinity grades of polypropylene, polyethylene or both (i.e., grades of polypropylene having crystallinity below the crystallinity of the first and second polypropylenes), which may be isotactic, syndiotactic or atactic. When included, such lower crystallinity materials will typically comprise at least about 0.5%, more typically at least about 2.0% and even more typically at least about 6%, but typically less than about 25%, although possibly more, more typically less than about 16% and even more typically less than about 10% by weight of the overall polymeric material.

Several polypropylenes suitable as the high crystallinity polypropylenes, the first or second polypropylenes, combinations thereof or the lower crystallinity polypropylenes are listed herein and discussed below as PP-1, PP-2 and PP-3. Of course, others may be used as described herein or otherwise.

The elastomer of the polymeric material can comprise a variety of elastomers but typically includes a substantial portion of thermoplastic elastomer and the thermoplastic elastomer typically includes one or more polyolefin and/or alpha-olefin elastomers (e.g., SLEPs, LEPs or both). The thermoplastic elastomer may be a neat elastomer or a blend. Substantially linear and linear ethylene polymers (SLEPs) are particularly preferred. Substantially linear ethylene polymers and linear ethylene polymers and their method of preparation are fully described in U.S. Pat. Nos. 5,272,236; 5,278,272; 3,645,992; 4,937,299; 4,701,432; 4,937,301; 4,935,397; 5,055,438; and EP 129,368; EP 260,999; and WO 90/07526, which are fully incorporated herein by reference.

As used herein, "a linear or substantially linear ethylene polymer" means a homopolymer of ethylene or a copolymer of ethylene and one or more alpha-olefin comonomers having a linear backbone (i.e. no cross linking), a specific and limited amount of long-chain branching or no long-chain branching, a narrow molecular weight distribution, a narrow composition distribution (e.g., for alpha-olefin copolymers) or a combination thereof. More explanation of such polymers is discussed in U.S. Pat. No. 6,403,692, which is incorporated herein by reference for all purposes.

In preferred embodiments, the one or more polyolefin elastomers will each include an alpha-olefin comonomer. Illustrative alpha-olefins include propylene, 1-butene, 1-hexene, 4-methyl-1-pentene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene and styrene. The alpha-olefin is desirably a $C_3$-$C_{20}$ or $C_3$-$C_{10}$ alpha-olefin. Preferred copolymers include EP, EB, ethylene/hexene-1 (EH) and EO polymers. Illustrative terpolymers include an ethylene/propylene/octene terpolymer as well as terpolymers of ethylene, a $C_3$-$C_{20}$ alpha-olefin and a diene such as dicyclopentadiene, 1,4-hexadiene, piperylene or 5-ethylidene-2-norbornene. The polyolefin elastomers can have densities less than about 0.9 g/cc, melt flow rates of about 0.1 to about 30 g/10 min (at 190° C., 2.16 kg), and more specifically about 0.5 to about 25 g/10 min (at 190° C., 2.16 kg) and can have glass transition temperatures of less than about −30 C, or any combination thereof. The materials used herein optionally are substantially free of EPDM rubber.

In the polymeric material, the elastomer will typically be present in an amount less than about 60 wt %, more particularly less than about 50 wt %, and more specifically less than about 25 wt % but is typically greater than about 1 wt %, more typically greater than about 7 wt % and still more typically greater than about 10 wt % of the polymeric material. Higher or lower amounts of elastomer may also be employed unless otherwise specified. The make-up of the elastomer is typically such that the elastomer is comprised of a substantial amount or entirely of polyolefin elastomer. Typically at least 50%, although possibly less, more typically at least about 70% and even more typically at least about 90% by weight of the elastomer is comprised of one or more of the above discussed polyolefin elastomers (e.g., a SLEP, LEP or combination of both). It is also contemplated that the elastomer may be entirely, substantially entirely or consist essentially of one or more of the SLEPs, LEPs or a combination thereof as discussed herein. Examples of a suitable material that includes or consists essentially of an elastomer are commercially available from The Dow Chemical Company under the designation of ENGAGE® (e.g., including EG-8100, EG-8150 and/or EG-8200).

To achieve desired results, in certain embodiments, it can be desirable for the amount of thermoplastic or polyolefin elastomer (e.g. the SLEPs, LEPs or both) be within a range where that range is dependent upon the melt flow rate of the relatively highly crystalline portion of the thermoplastic polyolefin of the polymeric material. It has been found that that it is generally desirable for the weight percent (W) of the polyolefin elastomer (W) within the polymeric material to vary with the MFR (M) of the highly crystalline portion of thermoplastic polyolefin according the following equation:

$$W = 0.43(M) + 15.8$$

Thus, for a given MFR of the highly crystalline portion, the weight percent of the thermoplastic elastomer, and more particularly, the polyolefin elastomer is typically in a range that is determined by (W) according to the above equation and about ±30%, more typically ±20% and even more typically ±10% and even possibly ±5% thereof. For example, for an MFR (M) of 8, the weight percent (W) of polyolefin elastomer is 19.24% by weight ±10% thereof or about 17.316% to about 21.164% by weight of the polymeric material. This relationship has been found to be particular useful when amounts and types of fillers are used in accordance with the teachings here, although the relationship can be otherwise useful as well.

Advantageously, it has been found that desired properties (e.g., scratch and mar resistance and other discussed herein or otherwise) can be achieved through a proper balance of thermoplastic polyolefin and polyolefin elastomer, particularly if those ingredients are chosen appropriately without the need for grafted polymers. Thus, it is contemplated that the polymeric material of the present invention will be substantially without any grafted polymers or may consist essentially of non-grafted polymers. It is also contemplated, however, that such ingredients can be included in the polymeric material unless otherwise indicated.

As such, it is contemplated that the thermoplastic polyolefin and particularly the one or more polypropylenes can be neat polymers, homopolymers or both. However, it is additionally contemplated that such terms and such material can allow for some degree of impurity which is typically less that 5%, more typically less than 2% and even more typically less that 0.8% by weight of whichever ingredient is specified.

Unless otherwise stated, "melt flow rate" and "melt index" herein is determined by ISO 1133. For polypropylene, polyethylene or combinations thereof, tests are at 230° C. with a 2.16 kg weight. For elastomer, tests are at 190° C. and 2.16 kg.

The polymeric material can also include filler. The filler can be at least about 4%, although possibly less, more typically at least about 9%, even more typically at least about 14% and still more typically at least about 17% by weight of the polymeric material and is also typically less than about 50%, although possibly more, more typically less than about 35%, even more typically less than about 25% and still more typically less than about 22% by weight of the polymeric material.

The filler can comprise multiple different filler materials or one singular filler material. Examples of suitable filler materials include, without limitation, clay, aramid, calcium carbonate, talc, kaolin, mica, wollastonite, hollow glass beads, titanium oxide, silica, carbon black, glass fiber, potassium titanate, silicate material, combinations thereof or the like which can take the form of powders, platelets or otherwise. One preferred filler material is talc and, in preferred embodiments, the filler is comprised of at least about 50%, more typically at least about 85% and even more typically at least about 95% talc. It is also contemplated that the filler be comprised entirely of talc without any other filler materials being within the polymeric material. One preferred talc is a powdered talc sold under the tradename JETFIL 7C, which is commercially available from Luzenac Inc., 423 Wyecroft Rd., Oakville, ON.

While it is contemplated that the filler could include calcined filler materials, in a preferred embodiment of the polymeric material, the filler is substantially without any calcined filler materials or consists of or consists essentially of uncalcined filler materials. Thus, it is contemplated that the polymeric material, the filler or both include less than about 5% by weight and more preferably less than about 1% by weight and still more preferably less than about 0.1% by weight and possibly entirely without any calcined filler material.

It is also contemplated that the polymeric material can include a variety of other additives such as surfactants, flexibilizers, strength agents, ignition resistant additives, stabilizers, colorants, antioxidants, antistats, slip-aids (i.e., for preventing slip), flow enhancers, nucleating agents, including clarifying agents, etc. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize thermoplastic compositions against degradation caused by, but not limited to heat, light, and oxygen, or a mixture thereof may be used. One preferred additive is antioxidant, which, when included, is typically included in a relatively small weight percentage of the overall polymeric material (e.g., less than about 1 or 2 percent). One preferred antioxidant is IRGANOX B225 antioxidant commercially available from Ciba Specialy Chemicals Corporation. Irganox B225 antioxidant is a blend of 1 part Irganox 1010 antioxidant and 1 part Irgafos 168 tris(2,4-t-butylphenyl) phosphite. Another preferred additive is a molding agent (e.g., a wax, mold relief or slip-aid). One preferred molding agent is a nitrogen or ammonia group containing compound such as an amine or an amide. One preferred nitrogen containing compound, which is a wax, is an erucamide sold under the tradename KENAMIDE ULTRA E, commercially available from Chemtura Corporation, Middlebury, Conn.

The various components of the polymeric material can be admixed and/or compounded according to a variety of protocols. Preparation of the filled polymeric material of this invention can be accomplished by any suitable mixing means known in the art, including dry blending the individual components and subsequently melt mixing, either directly in an extruder used to make the finished article (e.g., the automotive part), or pre-mixing in a separate extruder (e.g., a Banbury mixer). Dry blends of the compositions can also be directly injection molded without pre-melt mixing.

When softened or melted by the application of heat, the filled thermoplastic compositions of this invention can be fabricated into members or parts of articles using conventional techniques such as compression molding, injection molding, gas assisted injection molding, calendering, vacuum forming, thermoforming, extrusion and/or blow molding, alone or in combination. The filled thermoplastic compositions can also be formed, spun, or drawn into films, fibers, multi-layer laminates or extruded sheets, or can be compounded with one or more organic or inorganic substances, on any machine suitable for such purpose. The filled thermoplastic compositions of the present invention are preferably injection molded.

In one preferred embodiment, it is contemplated that the ingredients of the polymeric material are combined in such a manner that substantially all or all of the ingredients other than the relatively highly crystalline portion of the thermoplastic polyolefin are compounded together to form an admixture followed by compounding the admixture with the highly crystalline portion. For example, an admixture could be formed of the lower crystallinity polypropylene, the elastomer (e.g., the LEPs, SLEPs or both), the filler (e.g., the talc), the molding agent (e.g., the erucamide wax), the antioxidant or any combination thereof. Then, the admixture may be combined (e.g., melt mixed or blended) with the highly crystalline portion at a later time such as at the molding of the article (e.g., during or just prior to injection molding of the polymeric material).

The polymeric material of the present invention can be employed as part of a variety of articles of manufacture, however, it has already been found particularly suitable for use in forming automotive parts such as a panel, fascia (e.g., bumper fascia), automotive trim, automotive cowling, console (e.g., center overhead and/or floor assemblies) bumper beam, pillar, instrument panel, glove box assemblies including doors, knee bolster assemblies or instrument panel retainer assemblies or structural components. The polymeric material may also be used to form articles such as a snow mobile cowling or body cover, a personal water craft cowling or body cover, an all terrain vehicle cowling, fender, panel or body cover, an electrical equipment device housing, an appliance housing, a freezer container; lawn and garden furniture, building and construction sheets, a shoe, a boot, an outer ski boot shell, or an outer skate shell or the like.

In one preferred embodiment, the polymeric material is molded to form an instrument panel and/or dashboard of an automotive vehicle with a surface visible from the interior of a fully manufactured vehicle. It will be understood that one or more pigments or colorants may be added to the polymeric material such that the parts or components are "molded-in-color". Advantageously, an instrument panel or dashboard can have multiple desired properties such as scratch and mar resistance when formed of the polymeric material of the present invention.

It will be understood that, whatever part or article is formed from the polymeric material of the present invention, ingredients may be added to tailor the material to a particular use (e.g., it may be desirable to add a UV stabilizer to the material when used to form an exterior component of a vehicle). It will also be understood that components to be formed and welded of polymeric material described herein may not be visible during use of a particular article of manufacture. For example, structural components (e.g., structural HVAC ducts of an automotive vehicle) can be non-visible and may be welded to a backside of a visible component (e.g., a dashboard or instrument panel), which may or may not be formed of a polymeric material of the present invention.

The following examples illustrate various aspects of the present invention. The values shown are approximate and should not be regarded as limiting of the inventions. Variations in the processing parameters are possible as disclosed throughout the specification. In addition, the results shown may vary as well (e.g., by +/−10% or +/−25% of the stated values or even higher).

Materials, parts, members or surfaces thereof resulting from the teachings herein will have any combination of at least one, two (and more specifically at least 3 or all) of the following properties; namely, a flexural modulus that ranges from about 1300 to about 3000 MPa, more specifically about 1700 to about 2500 MPa, and still more specifically about 1900 to about 2300 MPa; failure in a ductile mode (e.g., multi-axial dart impact testing (Instrumented Dart Impact)) of greater than about 90% of samples, and more specifically, approximately 100% (at −40° C., −30° C. or 0° C.); scratch resistance according to FLTM BN108-13 of at least about 7 newtons, more typically at least about 10, 12 or 14 newtons (e.g., at least about 15 Newtons); and heat distortion under load (HDT) according to ISO 75 of greater than about 180° F. and more typically greater than about 203 or 211° F.

EXAMPLES

Examples of formulations for polymeric materials (the ingredients of which are more fully described in the paragraphs following the tables) in accordance with the present invention are provided in Tables I and II as well as properties measured for one of the polymeric materials below:

TABLE I

|  | Wt. Percents |
|---|---|
| PELLETS | |
| PP-2 | 59.5 |
| S/LEP-1 | 17 |
| PP-1 | 6 |
| POWDER | |
| TALC-1 | 17 |
| Erucamide | 0.3 |
| Antioxidant | 0.2 |
| PROPERTIES | Values |
| IDI 32F number ductile failures | 10/10 |
| IDI 32F total energy in-lbs | 417 |
| Peak energy in-lbs | 257 |
| ISO DTUL 66 psi flat (F) | 219 |
| Lt. Cashmere Fawn2 grain 5 finger scratch (Newtons) | 12 |
| MFR g/10 min | 6.9 |
| FlexModulus Mpa | 2203 |
| FlexStrength Mpa | 37 |

TABLE II

| Ingredients | Wt. Percents |
|---|---|
| PP-2 | 25-85% |
| PP-3 | 1-40% (more typically 1-30%) |
| PP-1 | 1-10% |
| S/LEP-1 | 10-25% |

TABLE II-continued

| Ingredients | Wt. Percents |
| --- | --- |
| TALC-1 | 5-20% |
| Antioxidant | 0.01-0.5% |
| Slip Aid (e.g., Erucamide) | 0.01-0.5% |

It should be understood that various ingredients may be substituted, added or removed from the above formulations without departing from the scope of the present invention. Moreover, it is contemplated that the weight percentages of the above ingredients and the values of the properties listed may vary up to or greater than ±5%, ±10%, ±25% or ±50% of the values listed. For example, a value of 10±10% results in a range of 9 to 11.

Welding of the Polymeric Material

Welding of polymeric composition or material according to the present invention will typically involve the formation of one or more welds that attach a first member to a second member. The first member and second member may be integral with each other (e.g., attached to each other) prior to welding or may be separate prior to welding. Potentially suitable welding techniques can include, without limitation, laser welding, flame welding, ultrasonic welding, electrical resistance welding, combinations thereof or the like. In a preferred embodiment, vibrational welding is employed to form the weld.

The first member and the second member can be formed of the polymeric materials described herein. Alternatively, it may be the case that only the first member is formed of the polymeric materials described herein while the second member may be formed of an alternative material such metal, glass, another polymeric material, combinations thereof or the like. It should be understood that, as used herein, the first member, the second member or both being formed of a particular material or composition means that the member can be partially, substantially entirely or entirely formed of the particular material.

Welding, according to the present invention, typically means that at least a portion or substantially the entirety of the first member is heated and softened (e.g., melted) to form a softened or molten portion. That portion or region of the first member is formed of the polymeric materials described herein and is contacted with a portion of the second member. Such contacting can occur before, after or during heating and/or softening. The softened or molten portion is then typically cooled and forms a weld attaching the first member to the second member. The molten portion, for attachment and forming the weld, may wet and adhere to a surface of the second member without the second member softening and/or melting, however, it is also possible that the second member may also have a portion that soften and/or melts and intermixes with the softened portion of the first member. Thus, in each instance, the weld is at least partially formed of the polymeric material described herein (i.e., the polymeric material of the first member and potentially polymeric material of the second member when the second member includes such material).

As an example of a welding process, particularly a vibrational welding process, of the present invention, reference is made to FIG. 1. A surface 10 of a first member 12 is contacted with a surface 14 of a second member 16 forming an interface 18 at the surfaces 10, 14. A forced is applied to one or both of the members 12, 16 urging the surface 10 of the first member 12 and the surface 14 of the second member 16 toward each other at the interface 18. The amount of pressure used to urge the surfaces toward each other can be varied. Such pressure is typically at least about 0.01 MPa, although possibly lower, more typically at least about 0.1 MPa and even more typically at least about 1 MPa and such pressure is typically less than about 50 MPa, although possibly higher, more typically less than about 10 MPa and even more typically less than about 5 MPa.

In the embodiment shown, the first member 12 and its surface 10 as well as the second member 16 and its surface 14 are formed of the same material (i.e., a material as described herein). However, either of the member[s] 12, 16, portions of the member[s] 12, 16 or surface[s] 10, 14 of the member[s] 12, 16 could be formed of different materials according to arrangements discussed herein.

Figure 1A:
FIG. 1A is an illustration of an exemplary structure having a weld according to the present invention.

During application of such pressure, one or more contacts (e.g., a first contact 30 and a second contact 32, which are often an upper and lower holding fixture) of a welding machine 34 (e.g., a vibration welding machine) are contacted with the members 12, 16. One or more of the contacts 30, 32 then oscillates (e.g., vibrates) one or both of the members 12, 16 such that at least one or both of the surfaces 10, 14 are moved relative to the other (i.e., oscillated transversely relative to each other) and develop frictional heat at the interface 18 thereby softening (e.g., melting) the material of one or both of the surfaces 10, 14 and portion[s] 38, 40 (i.e., portions as show with the dashed lines) of one or both of the members 12, 16 to a depth of the member[s] 12, 16. Thereafter, the softened or molten portion[s] 38, 40 cool to form a weld 42 as shown in FIG. 1A. The depth of the molten portions can vary depending upon the particulars of the welding technique used and the size and configuration of the members to be welded, but typical weld depths will be between about 0 mm and about 5 mm and more typically between about 0.5 mm and about 2 mm.

For assisting in the welding process (particularly the vibration welding process), one or more of the surfaces to be contacted and welded can include one or more ribs. Examples of such ribs[s] are shown and discussed in relation to FIGS. 2 and 2A, which show members to be welded together and tested for strength. When such ribs are used, it will be understood that, during vibrational welding, the oscillations of the members can cause the ribs to move back and forth along the lengths of the ribs and/or at angles relative to the lengths of the ribs. As an example, a member could include ribs (e.g., box shaped ribs) that are at right angles relative to each other and the oscillations could be at 45 degree angles to those ribs.

Various welding machines and apparatuses may be employed in the practice of this invention. Examples of preferred vibrational welding machines include, without limitation, machines sold under the trade designations: VWB3900 Vibration Welder, VWB3500 Vibration Welder and VWB3700 Vibration Welder, commercially available from Dukane Corporation, 2900 Dukane Drive, St. Charles, Ill. 60174; DLVW-3648 Digital (Servo Drive) Linear Vibration Welder, DLVW-2020 Digital (Servo Drive) Linear Vibration Weld and DLVW-2046 Digital (Servo Drive) Linear Vibration Welder commercially available from Forward Technology, 260 Jenks Avenue, Cokato, Minn. 55321; and VW/6UH and VW/4L-1 ultrasonic models commercially available from Branson Ultrasonics Corporation, 41 Eagle Rd., Danbury, Conn. 06813-1961.

Generally, it is contemplated that surfaces and portions welded according to the present invention can be substantially or entirely planar or can be contoured and the welds of the present invention can assist in forming a variety of joints. As examples, welds of the present invention can form or be part of butt joints, tongue and groove joints, interference joints, lap joints, flat joints, combinations thereof or the like. Moreover, exemplary surfaces that can be welded include angular surfaces, opposing surface, chamfered surfaces, concave surfaces, convex surfaces, interlocking surfaces, arced surfaces, geometric surfaces, combinations thereof or the like.

Figure 2:
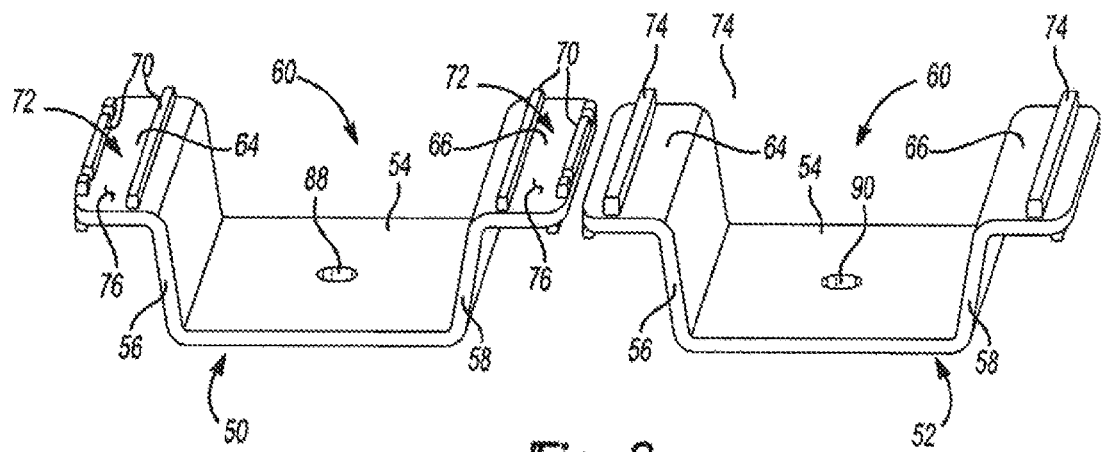
FIG. 2 is an illustration of members to be welded according to an aspect of the present invention.
Figure 2A:
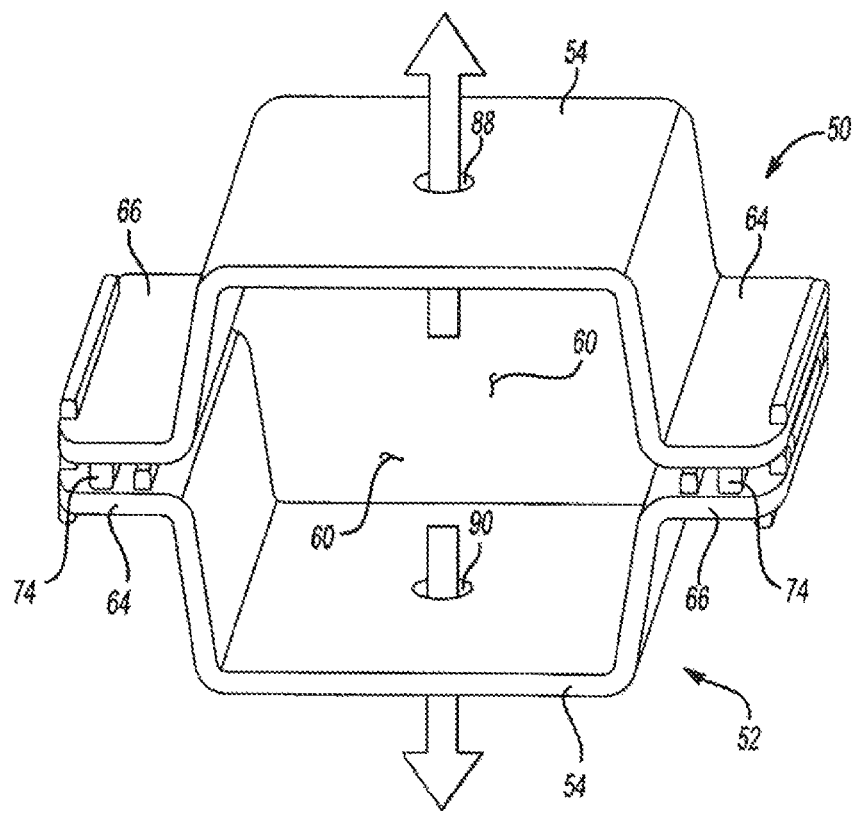
FIG. 2A is an illustration of the members of FIG. 2 contacting each other in a manner suitable for welding according to an aspect of the present invention.

It has been found that welds formed of the polymeric material or composition disclosed herein can exhibit desirable weld strengths. The testing according to the present invention can be tested according to ASTM D-638, which standard technique is modified as described herein. With reference, to FIGS. 2 and 2A, a first member 50 and a second member 52 are formed of the polymeric material described herein to include a central wall 54 and side walls 56, 58 defining a cavity 60. Each of the members 50, 52 additionally includes flanges 64, 66 extending from the side walls 56, 58. The flanges 64, 66 of the first member 50 include protection walls 70 defining welding location wells 72 where the protection walls 70 can protect against weld flash. The flanges 64 of the second member 52 each include a welding rib 74 that is 2 inches in length by ⅛ inch in height and ⅛ inch in width. As shown in FIG. 2A, the ribs 74 (i.e., a surface of each of the ribs) of the second member 52 are contacted with a surface 76 of the flanges 64, 66 of the first member 50 in the welding wells 72. Thereafter, the members 50, 52 in the configuration shown in FIG. 2A are vibration welded together using a weld force of 100 pounds, a vibration amplitude of 0.070 inches, a melt of 1.0 mm, hold force of 100 pounds, hold time of 3.0 seconds and weld time of 5.0 seconds to form welds 78 of FIG. 3A.

Figure 3:
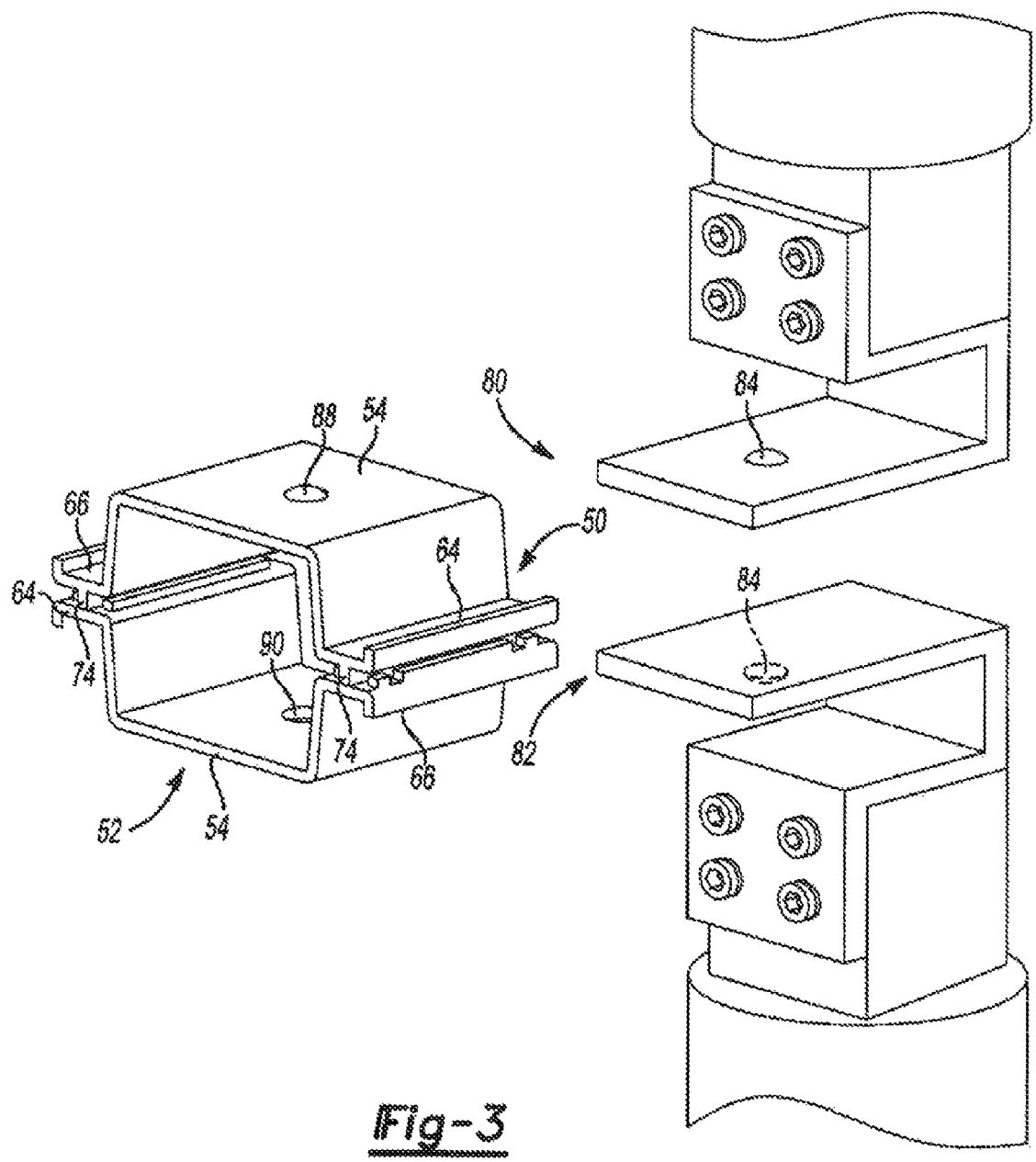
FIG. 3 is a perspective view of an exemplary testing apparatus suitable for testing weld strength according to an aspect of the present invention.
Figure 3A:
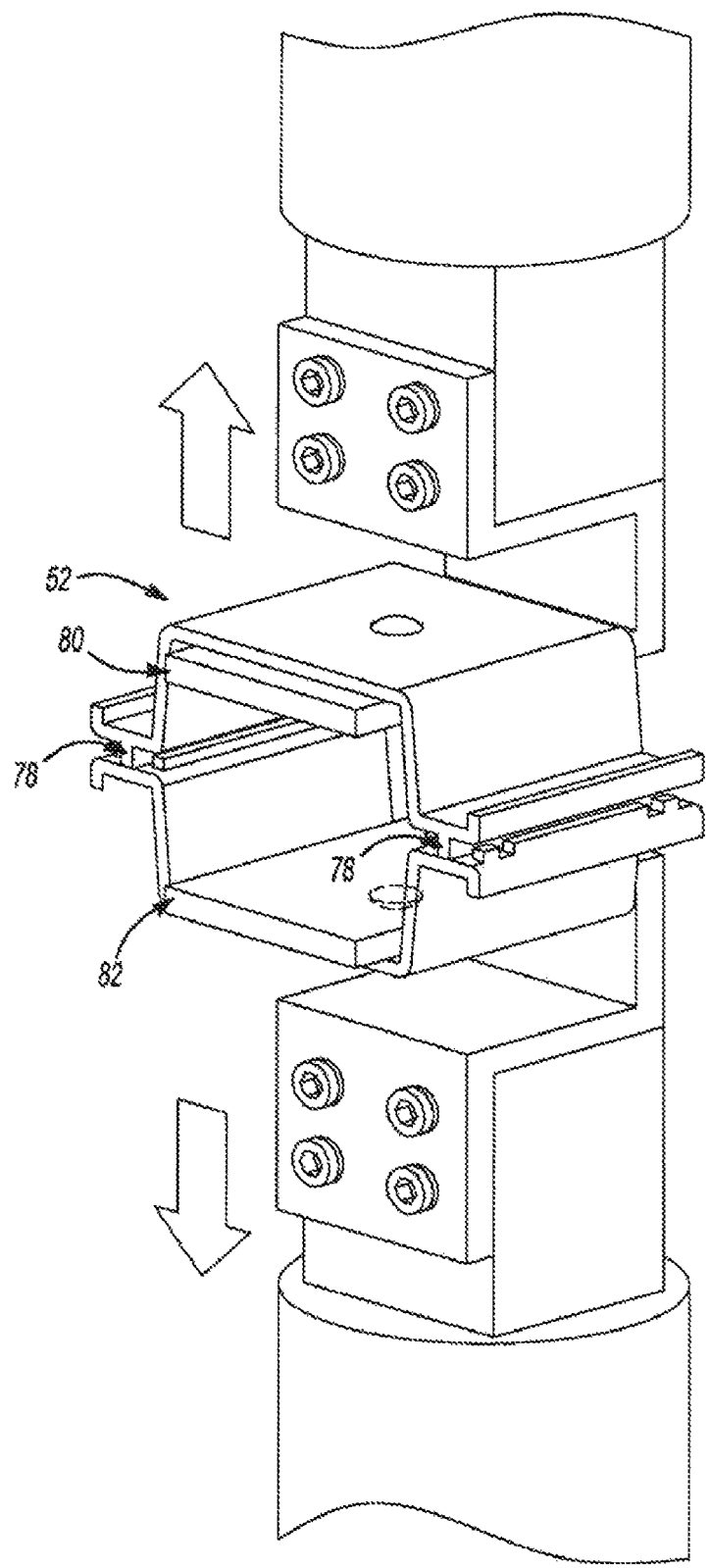
FIG. 3A is a perspective view of the exemplary testing apparatus of FIG. 3 testing the weld strength of welds, which are holding the members of FIGS. 2 and 2A together.

Once the members 50, 52 are welded together, they are tensile tested according to the parameters of ASTM D-638 using a standard tensile testing machine with the exception that the modified fixtures 80, 82 shown as metal hook-shaped members in FIGS. 3 and 3A, are extended into the cavities 60 of the members 50, 52 and protrusions 84 of the members 50, 52 are located in openings 88, 90 of the members 50, 52. The members 50, 52 can then be securely moved away from each other until the welds 78 fail (i.e., rupture, break, undergo plastic deformation) Under these conditions, the welds have exhibited energy to break of at least about 2.0 Joules, more typically at least about 2.5 Joules, even more typically at least about 3.0 Joules and still more typically at least about 3.5 Joules. The welds have also exhibited a maximum displacement of at least about 8 mm, more typically at least about 8.8 mm, even more typically at least about 9.6 mm and still more typically at least about 10.5 mm. The welds also withstood a maximum load of at least about 400 newtons, more typically at least about 480 Newtons, even more typically at least about 510 Newtons and still more typically at least about 535 Newtons. It should be understood that, while desirable properties for welds of the present invention are disclosed herein, no particular properties are required unless otherwise specifically recited.

While, as suggested, the welding techniques and polymeric materials of the present invention can be employed in forming a variety of structures of a variety of articles of manufacture, a subset of structures that particularly benefit from the techniques, materials or both have been particularly identified. Examples include glove box door assemblies, knee bolster assemblies and structural ducts such as vehicle HVAC ducts. Of course, it should be understood that the present invention is not to be limited to any particularly structure unless otherwise specifically stated.

"PP-1" is a high impact polypropylene copolymer having an ethylene content of about 12%, a density of 0.89 g/cm$^3$, a melt flow rate of 1.2 at 230° C. and an applied load of 2.16 kg;

"PP-2" is an isotatic polypropylene homopolymer available as D118.01 Dow propylene from The Dow Chemical Company having a density of 0.90 g/cm$^3$ and a melt flow rate of 8 at 230° C. and an appliel d oad of 2.16 kg;

"PP-3" is an isotatic polypropylene homopolymer available as D221 from The Dow Chemical Company having a density of 0.90 g/cm$^3$, a melt flow rate of 35 at 230° C. and an applied load of 2.16 kg;

"S/LEP-1" is a substantially linear ethylene/octene copolymer available as ENGAGE® EG 8200 from The Dow Chemical Company having a density of approximately 0.87 g/cm$^3$, a melt flow rate of 5 g/10 min. determined at 190° C. and an applied load of 2.16 kg, a molecular weight distribution of 2.1 and a CBDI of greater than 50;

"TALC 1" is a commercially available uncalcined mineral talc available as JETFIL™ 7C from Luzenac having a median particle size of 1.5 microns and a maximum particle size of 10 to 12 microns;

"Erucamide" is a slip or scratch resistance agent formed of an unsaturated fatty amide with the formula $C_{22}H_{43}NO$ and also referred to as cis-13-docosenoic amide, (Z)-13-docosenamide, erucylamide, (Z)-docos-13-enamide and available as KEMAMIDE™ from Witco; and "IRGANOX™ B 225 FF" is a 1:1 mixture of IRGANOX 1010 and tris(2,4-di-tert-butylphenyl phosphite antioxidant available from Ciba Geigy in the form of a flake.

Testing, unless otherwise stated, is preferably performed according to the following specifications:

"MFR" melt flow rate is determined according to ISO 1133 on a Kayness apparatus operating at 230° C. and an applied load of 2.16 kg;

"Flexural Tangent Modulus" is determined in accordance with ISO 178. Testing is performed using a United mechanical tester;

"Density" is measured according to ISO 1183;

"HDT" heat distortion under load is determined on a Ceast HDT 300. Vicat machine in accordance with ISO 75 where test specimens are unannealed and tested under an applied pressure of 0.45 MPa;

"Dart" instrumented impact is determined according to ASTM D 3763 using a MTS 810 instrumented impact tester at 15 miles per hour (MPH) impact. Test results were determined at 0° C. Specimens were inspected and judged as brittle or ductile fractures, test results are reported as number of specimens with ductile behavior; and "Scratch Resistance" levels are determined according to the Ford Lab Test Method (FLTM BN108-13). The apparatus consists of a moveable platform connected to five beams (250 mm long). A scratch pin is attached to one end of each beam. On the tip on each pin is a highly polished hardened steel ball (1.0+/−0.1 mm diameter). Each pin is loaded with a weight that exerts a force on the surface of a test plaque. Four force levels of the following may be selected: 15 Newton (N), 12 N, 10 N, and 7N and 3N. Driven by compressed air, the beams draw the pins across the surface of the plaque, which generates scratches or scratch whitening. A sliding velocity of approximately 100 mm/s is maintained. All tests are performed at room temperature on test plaques conditioned at 25° C. for more than 24 h prior to testing. The highest force value that doesn't produce scratch whitening is reported.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A process of welding a polymeric material, the process, comprising:
    providing a first member having a surface wherein the first member and the surface are formed of a polymeric composition and the polymeric composition includes:
    i. thermoplastic polyolefin that includes a relatively high crystallinity portion having a crystallinity greater than about 65%, wherein the relatively high crystallinity portion includes one or more polypropylenes homopolymers, and the highly crystalline portion is at least 40% of the thermoplastic polyolefin; and
    ii. 10% to 25% by weight polyolefin elastomer, wherein the polyolefin elastomer is formed of one or more linear or substantially linear ethylene copolymers, wherein the one or more linear or substantially linear ethylene copolymers are copolymers consisting of ethylene and one or more α-olefin comonomers;
    wherein the polymeric composition includes less than about 1 weight percent of a calcined filler, or is without any calcined filler;
    providing a second member having a surface;
    heating and softening at least a portion of the polymeric composition the first member;
    contacting the portion of the polymeric composition with the second member and allowing the portion to cool and harden thereby forming a weld connecting the first member to the second member, the weld being at least partially formed of the polymeric composition.

2. A process as in claim 1 wherein the step of heating and softening portion of polymeric material includes vibration welding of the first member to the second member.

3. A process as in claim 1 wherein the step of heating and softening the at least a portion of the polymeric composition includes contacting the surface of the first member with the surface of the second member and oscillating the first member relative to the second member or the second member relative to the first member thereby forming frictional heat that melts the polymeric composition of the first member.

4. A process as in claim 3 wherein the surface of the first member is part of a rib extending from the first member.

5. A process as in claim 1 wherein the heating and softening occurs simultaneous with or after the contacting.

6. A process as in claim 1 wherein the first member and the second member are part of one integral component.

7. A process as in claim 1 wherein the second member and the surface of the second member are formed of the polymeric composition.

8. A process as in claim 1 wherein the second member and the surface of the second member are formed of a material different than the polymeric composition.

9. A process as in claim 1 wherein the thermoplastic polyolefin includes one or more lower crystallinity polypropylene grades having a crystallinity less than the relatively high crystallinity portion, wherein the concentration of the low crystallinity grades is from 0.5 weight percent to 25 weight percent based on the total weight of the polymeric composition, and the relatively high crystallinity portion has a melt flow rate from about 4 to about 29 g/10 min measured at 230° C./2.16 kg.

10. A process as in claim 1 wherein the concentration of the thermoplastic polyolefin is about 60% to about 90% by weight of the polymeric composition, and wherein the surface of the first member exhibits a scratch resistance of at least about 7 newtons.

11. A process as in claim 9 wherein the composition includes:
    i. at least about 9 weight percent filler, wherein the filler includes at least 80% by weight talc;
    ii. antioxidant; and
    iii. slip or scratch resistance additive; and
    wherein the concentration of the relatively high crystallinity portion is at least 70 weight percent based on the total weight of the thermoplastic polyolefin;
    the concentration of the one or more polypropylene homopolymers weight percent based on the total weight of the relatively high crystallinity portion;
    the polyolefin elastomer has a melt flow rate measured at 190° C./2.16 kg from bout 0.5 to about 25 g/10 minutes; and
    the one or more linear or substantially linear ethylene copolymers is a copolymer of ethylene and propylene, a copolymer of ethylene and butane, a copolymer of ethylene and hexene, a copolymer of ethylene and octane, or any combination thereof.

12. A process as in claim 1 wherein the polyolefin elastomer is substantially entirely formed of one or more linear ethylene copolymers, one or more substantially linear ethylene copolymers, or both.

13. A process as in claim 10, wherein the weight percent (W) of the polyolefin elastomer within the polymeric material varies with the MFR (M) of the highly crystalline portion of thermoplastic polyolefin according the following equation:

$$W=0.43(M)+15.8$$

wherein the concentration of the polyolefin elastomer is in a range that is determined by (W) according to the above equation and about ±30% thereof, and wherein the polymeric composition is substantially without any grafted polymers.

14. A process as in claim 10, wherein the polymeric composition includes talc at a concentration of less than about 22 weight percent, based on the total weight of the polymeric composition.

15. A process of welding a polymeric material, the process, comprising:
    providing a first member having a surface wherein the first member and the surface are formed of a polymeric composition and the polymeric composition includes:
    i. a thermoplastic polyolefin that includes a relatively high crystallinity portion, wherein the relatively high crystallinity portion has a crystallinity greater than about 50%, wherein the highly crystalline portion includes one or more homopolymer polypropylenes, wherein the concentration of the one or more homopolymer polypropylenes is at least 95 weight percent, based on the total weight of the relatively high crystallinity portion; and the concentration of the relatively high crystallinity portion is at least 40% by weight, based on the total weight of the thermoplastic polyolefin; and ii. 10% to 25% by weight polyolefin elastomer wherein the elastomer is substantially entirely formed of a. one or more linear ethylene copolymers consist of ethylene and one or more α-olefin comonomers, b. one or more substantially linear ethylene copolymers consisting of ethylene and one or more α-olefin comonomers, or c. both a. and b.;

providing a second member having a surface;

contacting the surface of the first member with the surface of the second member and oscillating the first member or second member for frictionally heating and softening at least a portion of the polymeric composition of the first member; and allowing the portion to cool and harden thereby forming a weld connecting the first member to the second member, the weld being at least partially formed of the polymeric composition;

wherein the polymeric composition includes less than about 1 weight percent of a calcined filler, or is without any calcined filler.

16. A process as in claim 15 wherein the concentration of the thermoplastic polyolefin is about 60% to about 90% by weight, based on the total weight of the polymeric composition, and wherein the surface of the first member exhibits a scratch resistance of at least about 7 newtons.

17. A process as claim 15 wherein the thermoplastic polyolefin includes a first, second and third polypropylene and wherein the first and second polypropylenes are part of the highly crystalline portion and the third polypropylene is a lower crystallinity polypropylene.

18. A process as in claim 15 wherein the weight percent (W) of the polyolefin elastomer within the polymeric material varies with the MFR (M) of the highly crystalline portion of thermoplastic polyolefin according the following equation:

$$W=0.43(M)+15.8$$

wherein the polyol in elastomer is in a range that is determined by (W) according to the above equation and about ±30% thereof.

19. A process as in claim 15 wherein the polymeric composition is substantially without any grafted polymers.

20. A process of welding a polymeric material, the process, comprising:

providing a first member having a surface wherein the first member and the surface are formed of a polymeric composition and the polymeric composition includes:

i. a thermoplastic polyolefin that includes a relatively high crystallinity portion; wherein the relatively high crystallinity portion is formed substantially entirely of one or more polypropylenes homopolymers; the relatively high crystallinity portion has a crystallinity greater than about 50%; the relatively high crystallinity portion has a melt flow rate from about 4 to about 20 g/10 min measured at 230° C./2.16 kg; the concentration of the relatively high crystallinity portion is at least 40% by weight, based on the total weight of the thermoplastic polyolefin; and the concentration of the thermoplastic polyolefin is about 60% to about 90% by weight, based on the total weight of the polymeric composition; and ii. 10% to 25% by weight polyolefin elastomer wherein the elastomer substantially entirely formed of a. one or more linear ethylene copolymers consisting of ethylene and one or more α-olefin comonomers, b. one or more substantially linear ethylene copolymers consisting of ethylene and one or more α-olefin comonomers, or c. both a. and b.;

providing a second member having a surface wherein the second member and surface of the second member are formed of the polymeric composition;

contacting the surface of the first member with the surface of the second member and oscillating the first member or second member for frictionally heating and softening at least a portion of the polymeric composition of the first member; and allowing the portion to cool and harden thereby forming a weld connecting the first member to the second member, the weld being at least partially formed of the polymeric composition;

wherein the surface of the first member exhibits a scratch resistance of at least about 7 newtons, wherein the polymeric composition is substantially without any grafted polymers, and the polymeric composition is substantially without any calcined fillers; and wherein the composition includes:

i. 5% to 40% filler that includes at least at least 88% by weight talc;

ii. antioxidant; and iii. erucamide.

* * * * *

UNITED STATES PATENT AND TRADEMARK OFFICE
CERTIFICATE OF CORRECTION

| | | |
|---|---|---|
| PATENT NO. | : 7,862,671 B2 | Page 1 of 1 |
| APPLICATION NO. | : 11/622191 | |
| DATED | : January 4, 2011 | |
| INVENTOR(S) | : James Thomas Seliskar and James David Oelberg | |

It is certified that error appears in the above-identified patent and that said Letters Patent is hereby corrected as shown below:

Col. 16, claim 20, line 42, replace 88% with 80%.

Signed and Sealed this
First Day of March, 2011

David J. Kappos
*Director of the United States Patent and Trademark Office*